(12) United States Patent
Clover (10) Patent No.: US 7,117,997 B2
(45) Date of Patent: Oct. 10, 2006

(54) PORTABLE MATERIAL STAND

(75) Inventor: Thomas J. Clover, 2002 Elvira Way, Green Bay, WI (US) 54313

(73) Assignee: Thomas J. Clover, Green Bay, WI (US)

( * ) Notice: Subject to any disclaimer, the term of this patent is extended or adjusted under 35 U.S.C. 154(b) by 266 days.

(21) Appl. No.: 10/809,988

(22) Filed: Mar. 26, 2004

(65) Prior Publication Data

US 2004/0195472 A1 Oct. 7, 2004

Related U.S. Application Data

(60) Provisional application No. 60/320,087, filed on Apr. 4, 2003.

(51) Int. Cl.
*A47G 29/00* (2006.01)

(52) U.S. Cl. .................. 211/41.15; 211/189

(58) Field of Classification Search ........... 248/453, 248/441.1, 460, 455, 127, 146, 176.1; 206/454, 206/448, 321; 211/183, 189, 41.1, 41.14, 211/41.15
See application file for complete search history.

(56) References Cited

U.S. PATENT DOCUMENTS

| 2,839,198 | A | * | 6/1958 | Lefevre ............... 211/41.14 |
| 2,863,566 | A | * | 12/1958 | White et al. ........ 211/41.14 |
| 3,584,839 | A | | 6/1971 | Dickey |
| 3,630,491 | A | | 12/1971 | Puccio |
| 3,719,284 | A | * | 3/1973 | Rasmussen ............. 211/50 |
| 3,863,899 | A | | 2/1975 | Werner |
| 3,867,997 | A | | 2/1975 | Hyslop, Jr. |
| 3,863,900 | A | | 4/1975 | Dagiel et al. |
| 3,880,405 | A | | 4/1975 | Brueske |
| 3,920,221 | A | | 11/1975 | Berry et al. |
| 4,003,553 | A | | 1/1977 | Morris |
| 4,014,435 | A | | 3/1977 | Rowley et al. |
| 4,037,824 | A | | 7/1977 | Whitmer |
| 4,145,031 | A | | 3/1979 | Baker, II |
| 4,304,336 | A | * | 12/1981 | Mays .................. 211/41.14 |
| 4,326,726 | A | | 4/1982 | Dunchock |
| 4,360,211 | A | | 11/1982 | Blake |
| 4,448,434 | A | | 5/1984 | Anderson |
| 4,537,421 | A | | 8/1985 | Teachout |
| 4,626,017 | A | * | 12/1986 | Robertson ................. 296/3 |
| 4,666,131 | A | | 5/1987 | Kettelkamp, Sr. et al. |
| 4,669,577 | A | | 6/1987 | Werner |
| 4,699,280 | A | | 10/1987 | Hoss |
| 4,909,483 | A | | 3/1990 | van Herpen |
| 4,979,725 | A | | 12/1990 | Hutchings, II et al. |
| 5,029,670 | A | | 7/1991 | Whitmer |
| 5,037,117 | A | | 8/1991 | Hershberger |
| 5,067,586 | A | | 11/1991 | Myers |
| 5,085,329 | A | | 2/1992 | Crowell et al. |
| 5,145,153 | A | | 9/1992 | Glynn |
| 5,148,924 | A | | 9/1992 | Mason et al. |
| 5,246,121 | A | * | 9/1993 | Mitake et al. ......... 211/41.13 |
| 5,253,887 | A | | 10/1993 | Marenger |
| 5,297,685 | A | * | 3/1994 | Ramey .................. 211/59.4 |
| 5,431,372 | A | | 7/1995 | Kostelecky |

(Continued)

*Primary Examiner*—Jennifer E. Novosad
(74) *Attorney, Agent, or Firm*—Cardinal Law Group (57) ABSTRACT

A portable construction material stand is provided with a flanged support portion and a base portion. The portable construction material stand is adapted for use with a single support portion unattached to another support portion and does not use any cross-supports. The portable construction material stand may be used in conjunction with two or more portable material stands.

2 Claims, 10 Drawing Sheets

U.S. PATENT DOCUMENTS

| | | | |
|---|---|---|---|
| 5,513,826 A | | 5/1996 | Lebaron |
| 5,584,399 A | * | 12/1996 | King .................... 211/41.15 |
| 5,647,451 A | | 7/1997 | Reichel |
| 5,718,305 A | | 2/1998 | Palmer |
| 5,755,339 A | * | 5/1998 | Belanger et al. ......... 211/41.14 |
| 5,850,924 A | * | 12/1998 | Borter .................... 211/41.14 |
| 6,038,829 A | | 3/2000 | Franks |
| 6,039,150 A | | 3/2000 | Palmer |
| 6,386,376 B1 | * | 5/2002 | Mendoza-Castillo et al. .... 211/41.14 |
| 6,536,607 B1 | * | 3/2003 | Knoll et al. ............. 211/41.14 |
| 6,540,209 B1 | | 4/2003 | Ross |
| 6,742,663 B1 | * | 6/2004 | Chubb .................... 211/41.14 |
| 6,910,591 B1 | * | 6/2005 | Knoll et al. ............. 211/41.14 |
| 2003/0173314 A1 | * | 9/2003 | Knoll et al. ............. 211/41.14 |
| 2003/0183590 A1 | * | 10/2003 | Chubb .................... 211/41.14 |
| 2004/0140275 A1 | * | 7/2004 | Jeskey et al. ............ 211/41.14 |

* cited by examiner

PORTABLE MATERIAL STAND

RELATED APPLICATION

This application claims priority to U.S. Provisional Application Ser. No. 60/320,087 filed Apr. 4, 2003, and hereby incorporates the entire disclosure of that application by reference.

BACKGROUND OF INVENTION

1. Field of the Invention

The invention relates to material stands. More specifically, the invention relates to a stand that is portable and adapted to hold heavy objects.

2. Description of the Related Art

Construction job sites frequently have use for heavy objects that must be "staged" prior to placement at the desired site. All construction materials are delivered to the job site. Upon delivery to the job site, the material is removed from the truck, and placed in a temporary location. Frequently, material must be moved from its initial temporary location to another temporary location. Moving material is time consuming, and creates unnecessary work.

For example, many building sites use drywall in building walls. Drywall is also known as sheetrock. Drywall is very bulky and is frequently delivered in pieces that may be 12 feet long and 10 feet tall. Furthermore, each piece of drywall may weigh over 50–75 pounds.

In the past, drywall has tended to be staged by leaning against a previously constructed wall. At other times, drywall has been placed on the floor. While these methods are effective to remove the drywall from a certain work area, in practice, the drywall must frequently be staged in several locations. Each movement of the drywall requires heavy lifting and time.

Previous solutions to this problem have taken a variety of approaches. For example, Dunchock, in U.S. Pat. No. 4,326,726 issued Apr. 27, 1982 discloses a storage rack adapted for storing an automobile top. The Dunchock storage rack features a frame with four wheels on the corners, and beams connecting the side members, both longitudinally and along the sides. However, this rack is bulky, and would require frequent disassembly at a construction site. Furthermore, Dunchock does not appear to disclose a rack that is sufficiently sturdy to hold drywall. Additionally, the rack of Dunchock is configured to be only a certain width—moving objects wider than the rack would result in part of the object being moved being unsupported.

Rowley et al. in U.S. Pat. No. 4,014,435 issued Mar. 29, 1977 disclose a collapsible rack for shipping and/or storing glass sheets. The Rowley rack requires two support portions, connected by struts. Thus, the Rowley rack is also bulky and would require frequent disassembly at a construction site. Additionally, the rack of Rowley is configured to be only a certain width—moving objects wider than the rack would result in part of the object being unsupported.

Anderson discloses a collapsible hand truck in U.S. Pat. No. 4,448,434 issued May 15, 1984. However, the hand truck in Anderson would be unwieldy at a construction site, as it would be quite difficult to move several sheets of drywall, weighing several hundred pounds, with a hand truck. Furthermore, a hand truck is ill adapted to stage construction materials.

Teachout discloses a foldable dolly in U.S. Pat. No. 4,537,421 issued Aug. 27, 1985. Teachout has many of the same problems as Anderson. The wheels disclosed in Teachout make the hand dolly ill adapted to stage drywall, and using a dolly to move drywall at a construction site is ill advised. Additionally, the dolly of Teachout is configured to be only a certain width—moving objects wider than the dolly would result in part of the object being moved being unsupported.

Hoss, U.S. Pat. No. 4,699,280 issued Oct. 13, 1987, teaches a shipping rack that is convertible to first and second lengths. While Hoss overcomes the problem of limiting the width of the object, the rack is still limited to the maximum width allowable, and provides for two vertical spans which are connected by struts to each other.

Blake discloses a dolly apparatus in U.S. Pat. No. 4,360,211 issued Nov. 23, 1982. Blake has many of the same problems as Anderson. The wheels disclosed in Blake make the hand dolly ill adapted to stage drywall, and using a dolly to move drywall at a construction site is ill advised.

Additionally, the dolly of Blake is configured to be only a certain width—moving objects wider than the dolly would result in part of the object being moved being unsupported.

Hershberger discloses a folding table caddie in U.S. Pat. No. 5,037,117 issued Aug. 6, 1991. Hershberger also provides for two support portions, attached to base portions, attached to casters. Casters are ill-adapted to hold drywall, and the requirement that the support portions be linked to each other increases the bulkiness of the storage means.

Crowell et al. disclose a sheeting support in U.S. Pat. No. 5,085,329 issued Feb. 4, 1982. While the sheeting support of Crowell is adapted to drywall, Crowell requires the use of a connecting arrangement. Although the connecting arrangement allows for the support portions to be releasably connected, each support portion is attached to a substantial base portion that features a retaining strip to resist sliding.

Mason et al. disclose a sheet material handling frame in U.S. Pat. No. 5,148,924 issued Sep. 22, 1992. Mason shares some of the shortcomings of Crowell, in that Mason requires that the support portions be connected. Mason further requires the use of a restraining strap, and the use of cross-bars to space the stanchions. Therefore, the support portions of Mason are spaced apart a fixed distance, and illsuited to support sheets shorter than that distance.

King discloses a space efficient versatile storage frame system in U.S. Pat. No. 5,584,399 issued Dec. 17, 1996. King requires the use of support portions that are connected to each other by cross-members. While King allows for multiple configurations to store items without a large storage device, the adjustments are accomplished with fixed attachments, and is not likely able to support heavy drywall.

Marenger discloses a dolly modifying apparatus in U.S. Pat. No. 5,253,887 issued Oct. 19, 1993. Marenger discloses an apparatus with a selectively detachable frame with a triangular portion, as well as two support portions that are connected with a cross-bar and uses a strap.

It would be desirable therefore, to provide an apparatus that is sturdy enough to support drywall, provides the flexibility to support objects of multiple lengths, and is easily moved.

SUMMARY OF THE INVENTION

One embodiment of the invention provides a portable construction material stand including a base portion with a support portion extending upward from the base portion and attached to the base portion. The support portion includes an angled contact surface, wherein when planar construction material is positioned on the base and in contact with the contact surface, the stand maintains the material in a stationary position.

Another aspect of the invention provides a portable construction material stand system. The system includes a first and second stand each including a base portion and a support portion extending upward from the base portion and attached to the base portion. The support portion includes an angled contact surface, wherein when planar construction material is positioned on the bases of spaced apart stands and in contact with the contact surfaces of the stands, the first and second stands maintain the material in a stationary position.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE INVENTION

Figures 1A, 1B:
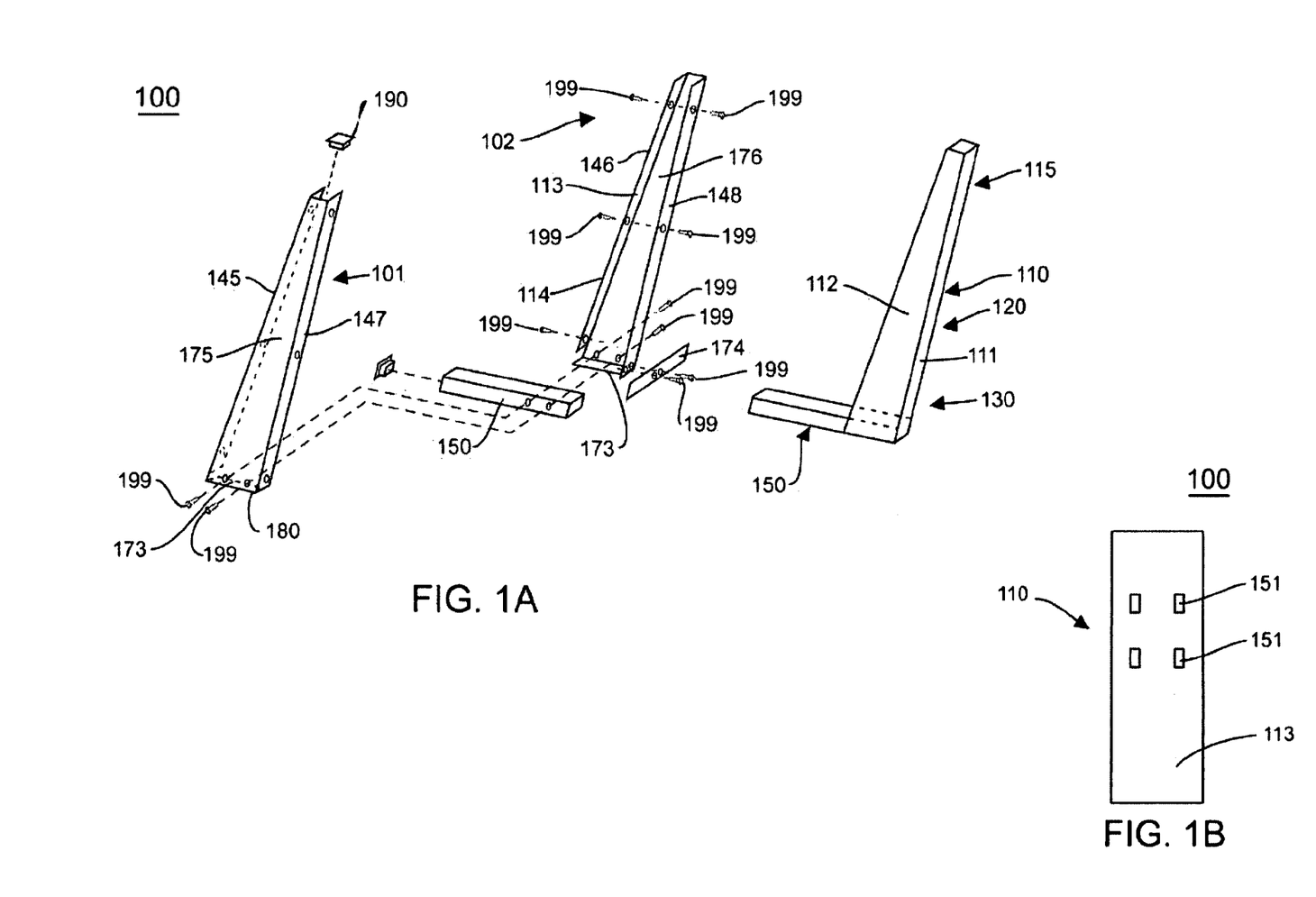
FIG. 1A illustrates an exploded side view of the portable material stand.
FIG. 1B illustrates a front view of one aspect of the invention.

FIG. 1A shows a side view of the portable construction material stand 100. Stand 100 includes a support portion 110 comprising a top section 115, middle section 120, and a bottom section 130. Portable construction material stand 100 further comprises a base portion 150 extending out from support portion, such that support portion 120 extends upward from the base portion 150. In one embodiment of the stand, bottom section 130 comprises a hole for attaching base portion 150 to support portion 110. In another embodiment of the portable material stand, bottom section 130 comprises a snap attachment, or snap fit, for affixing base portion 150 to support portion 110. In yet another embodiment of the portable material stand, bottom section 130 comprises means for attaching base portion 150 to support portion 130. In yet another embodiment of the invention, base portion 150 and support portion 110 are formed as a unitary member.

As further shown in FIG. 1A, bottom section 130 further comprises a flange 180 of flat metal opposite the base portion 150. In one embodiment, flange 180 is constructed from the same material as support portion 110. In another embodiment, flange 180 is constructed integrally with the support portion 110. In another embodiment, flange 180 is attached with screws or similar fastening means to a bottom section 130 of the support portion 110.

Support portion 110 has a back section 111, side sections 112, and a contact surface 113. Base portion 150 is affixed to the bottom section 130 of support portion 110 at the contact surface 113. Contact surface 113 angles down from the top section 115 to the bottom section 130, as shown in FIG. 1A. Back section 111 and side sections 112 may be substantially straight, or may be angled. In one embodiment, additional padding material 114 is placed upon contact surface 113. In one embodiment, padding material 114 is softer than contact surface 113 and provides for "padding." In one embodiment, padding material 114 is a padded tape. In another embodiment, padding material 114 is adhesively bonded to contact surface 113. In yet another embodiment, padding material 114 is removably affixed to contact surface 113 using means, such as, for example, snaps and latches. Embodiments featuring the use of padding material 114 may be especially suited for staging glass or materials with a painted or otherwise delicate, surface.

The base portion 150 and support portion 110 are configured such that when planar construction material is positioned on the base and in contact with a contact surface 113, the stand 100 maintains the material in a stationary position.

Figure 5A:
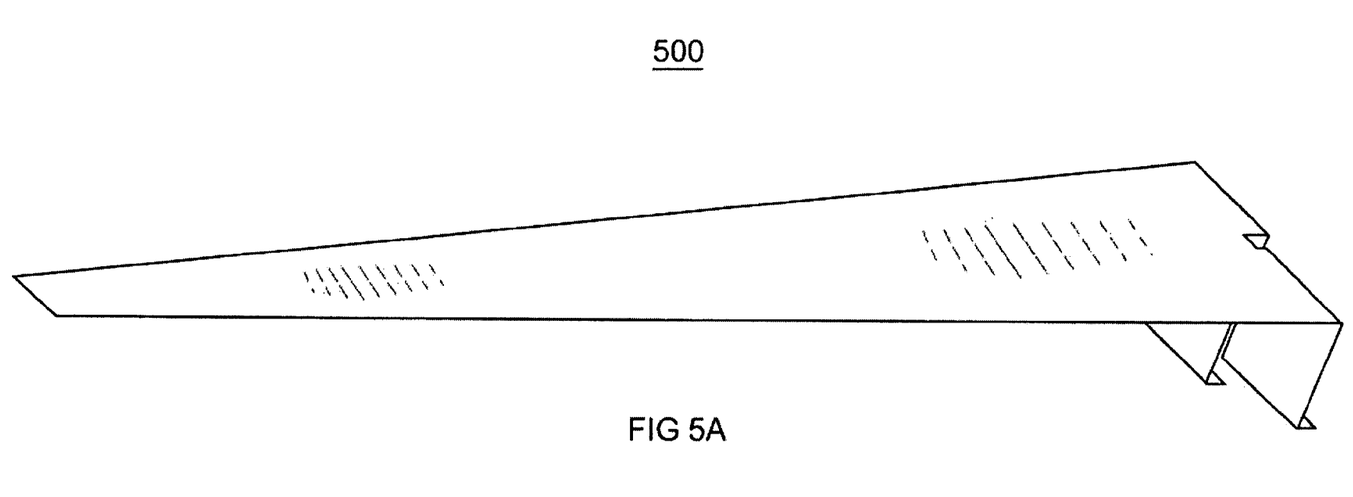
FIG. 5A illustrates a top view of one embodiment of a bracket in accordance with another aspect of the invention.
Figure 5B:
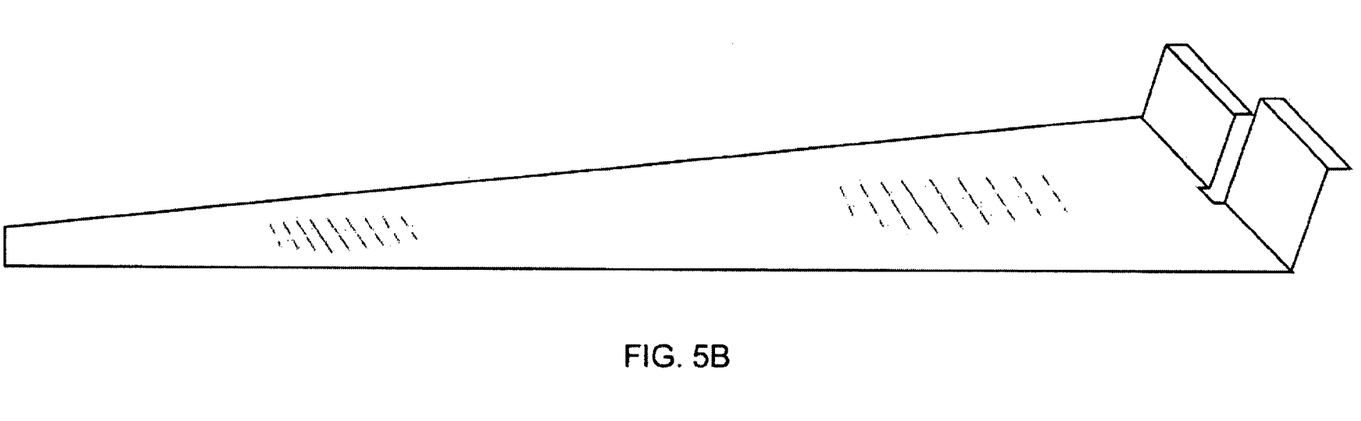
FIG. 5B illustrates a bottom view of one embodiment of a bracket in accordance with another aspect of the invention.
Figure 5C:
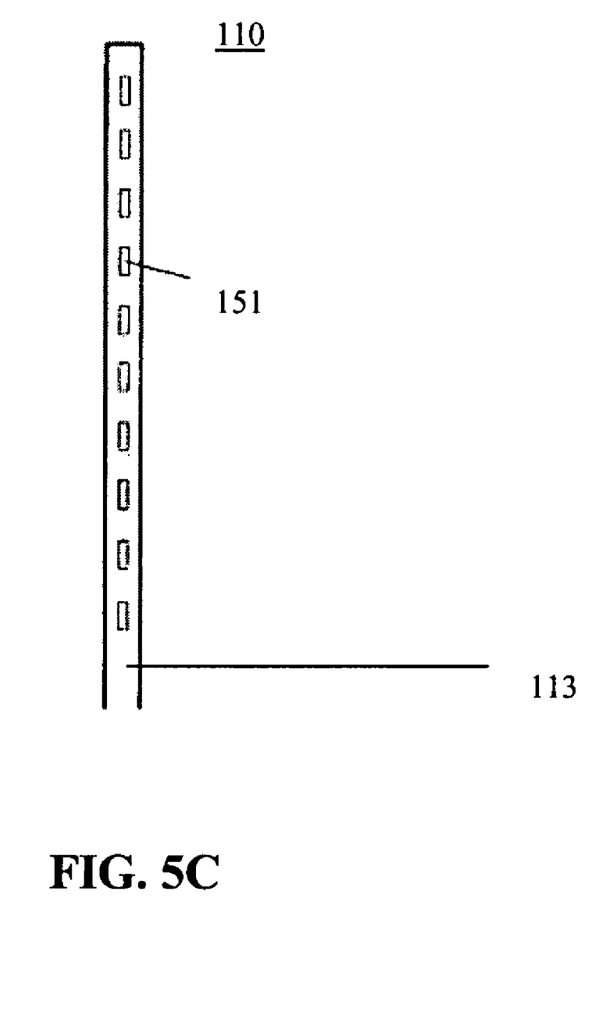
FIG. 5C illustrates a front view of another embodiment of the invention.

In yet another embodiment, contact surface 113 comprises at least one bracket hole 151. Each bracket hole 151 may comprise a single hole configured to accept a male portion of a bracket, or bracket hole 151 may comprise at least two holes configured to accept a male portion of a bracket. In one embodiment, a bracket is configured to mate with bracket holes 151 and serves to support additional materials, and creates a two-level stand. One embodiment of a bracket in accordance with an aspect of the invention is illustrated in FIGS. 5A and 5B at 500. A contact surface 113 featuring bracket holes 151 is illustrated at FIG. 1B at 100. In the embodiment illustrated in FIG. 5C, bracket holes 151 are configured for standard 1" spaced shelf brackets.

In one example, support portion 110 is 48 inches tall. In this example, support portion 110 is 8 inches long at bottom section 130, and is 2 inches long at top section 115. In this example, support portion 110 is 1.5 inches wide. In this example, base portion 150 is a 1.5-inch wide by 1.5-inch long tube. In this example, flange 180 is ⅝ inches long.

Support portion 110 may be manufactured from any suitable material, such as sheet metal, wood, rubber, PVC piping, steel or any such material. If the portable construction material stand is to be used for objects lighter than drywall, materials such as PVC piping, wood or lighter gage metals could be used. Support portion 110 may be constructed from a single piece of material, or may be constructed from multiple pieces that are connected fixedly, or removably. If support portion 110 is constructed from removably connected pieces, the pieces must have connection means. In one embodiment, support portion 110 could be telescopically constructed to allow support portion 110 to be extended to a variety of heights, and may feature means to lock the telescoping support portion in a desired position. Such means for locking the telescoping support portion may include grommets, screws, VELCRO-brand fasteners, latches, snaps or other suitable locking means. In one embodiment, the support portion 110 may be constructed with 18-gage sheet metal.

Base portion 150 may be constructed from any suitable material. Base portion 150 may be constructed from sheet metal, wood, rubber, PVC piping, steel or any such material. In one embodiment, base portion 150 may be constructed from the same material as support portion 110. In another embodiment, base portion 150 may be constructed with a non-slip surface. The non-slip surface may comprise rubber, or any other suitable material. In one embodiment, base portion may be telescopically constructed to allow base portion to be extended to a variety of lengths.

Base portion 150 may also be constructed to allow it to be affixed to the support portion 110 with connection means. These connection means may include the use of screws or dowels which are inserted through holes in the sides of the support portion, and through appropriately located holes in the base portion, such that upon proper alignment, the screw or dowel may be inserted through one side of the support portion, run through the base portion, and extend out through the opposite side of the support portion. In another embodiment, the base portion may "snap" fit into the support portion. In this "snap" embodiment, the base portion itself may act as the male snap with the support portion acting as the female member of the snap attachment. Those of ordinary skill in the art will realize that other snap configurations are possible.

In one embodiment, support portion 110 comprises a substantially triangular configuration. In one embodiment support portion 110 comprises a substantially right triangular configuration. In one embodiment, the angle formed between support portion 110 and base portion 150 is greater than 90 degrees.

Figure 2:
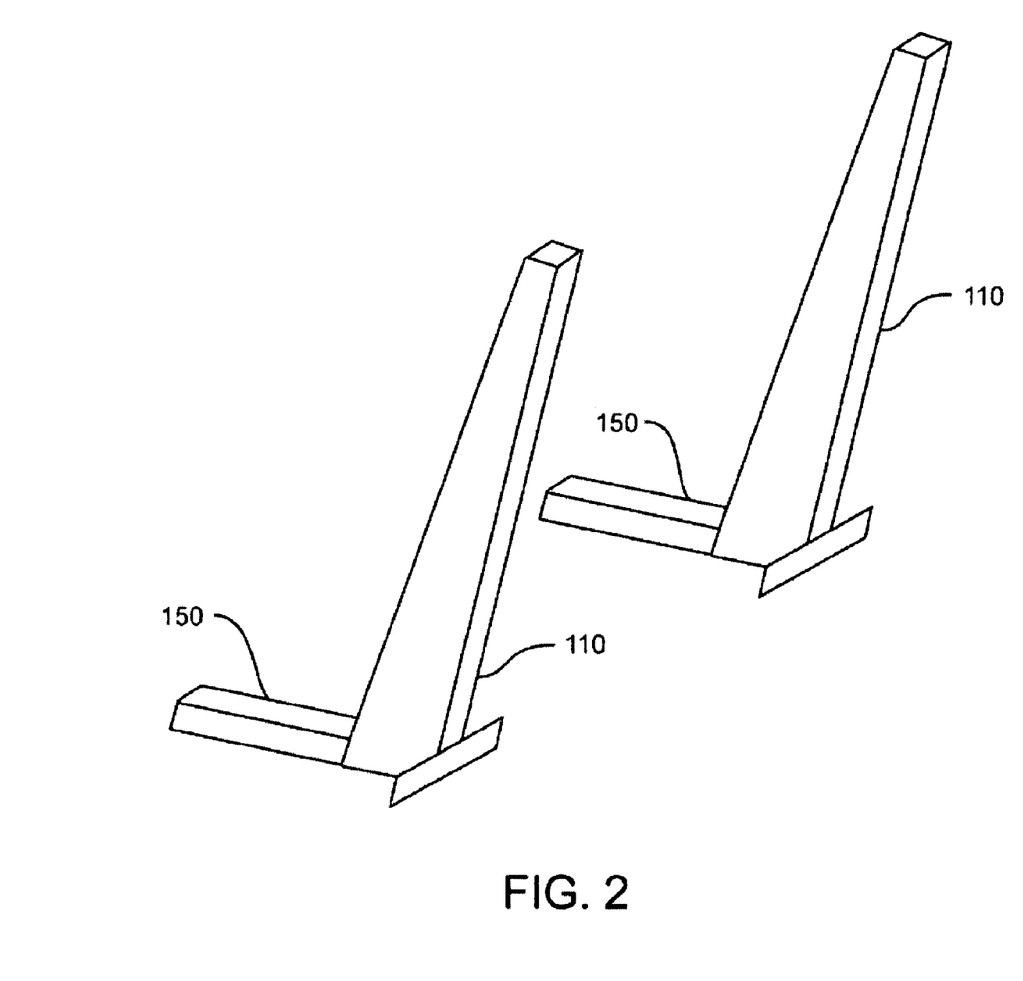
FIG. 2 illustrates one embodiment of the invention, comprising the use of two individual portable material stands.

In use, portable construction material stand may be used in conjunction with another material stand, as is shown in FIG. 2. Portable construction material stand is placed at a desired location, with support portion perpendicular to the ground. The material to be staged is then placed on the base portion 150, and leaned against support portion 110, with the contact surface of the support portion adjacent to the material.

In another embodiment, the portable material stand may be bolted to a support surface and support handrails. In one embodiment, the support surface is a floor. In another embodiment, the portable material stand is only temporarily bolted to the support surface.

FIG. 1A also illustrates one exemplary method of constructing the portable material stand. This embodiment of the invention uses two parts 101 and 102, each comprising a side panel 175 and side panel 176, with a base shoe 173, and a rear support bracket 174, as well as front panel 145 and 146 and back panel 147 and 148. The parts are connected using fasteners and grommets 199. Other connection means may be used as appropriate. The fasteners and grommets may be fabricated from metal, plastic, or any other suitable material. A top cap 190 may be used, or one of the parts may be fabricated with an integral cap that functions to prevent substances, such as dirt, grease, oil, nails, screws or any other foreign substance, from entering the gap between the two parts.

Additionally, the two parts may be constructed such that a "snap" assembly is possible, with one assembly part being a "male" part, and the second assembly being a "female" part. In this "snap" embodiment, the parts may be constructed such that the first part extends with a flap assembly, and the second part accepts the flap assembly of the first part with a slot assembly. Numerous configurations of such an assembly are possible. In yet another embodiment, the two parts may be connected by solder, glue, epoxy, caulk. VELCRO-brand fasteners or any other appropriate connecting means.

Figure 4:
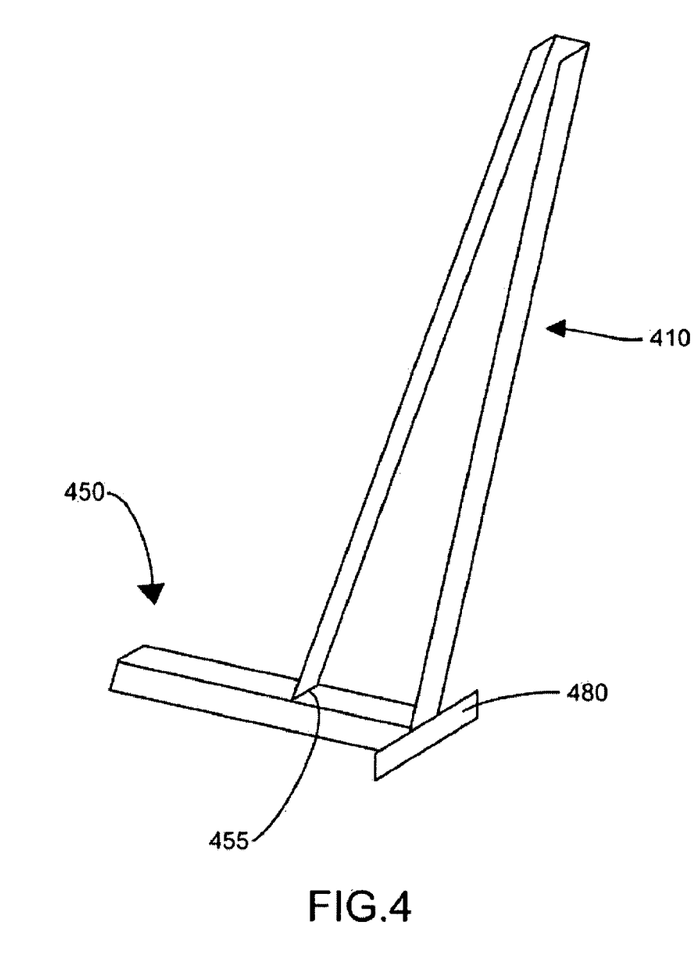
FIG. 4 illustrates another embodiment of a stand in accordance with the invention.

In other embodiments, only a single part 101 could be used to construct a stand in accordance with the invention. For example, FIG. 4 illustrates an embodiment of a stand in accordance with the invention comprising a single part 401, flange 480, and base portion 450. Base portion 450 comprises female slots 455 configured to accept a male portion of support portion 410, in one embodiment. In another embodiment, base portion 450, support portion 410 and flange 480 comprise a unitary piece of material.

Figure 3:
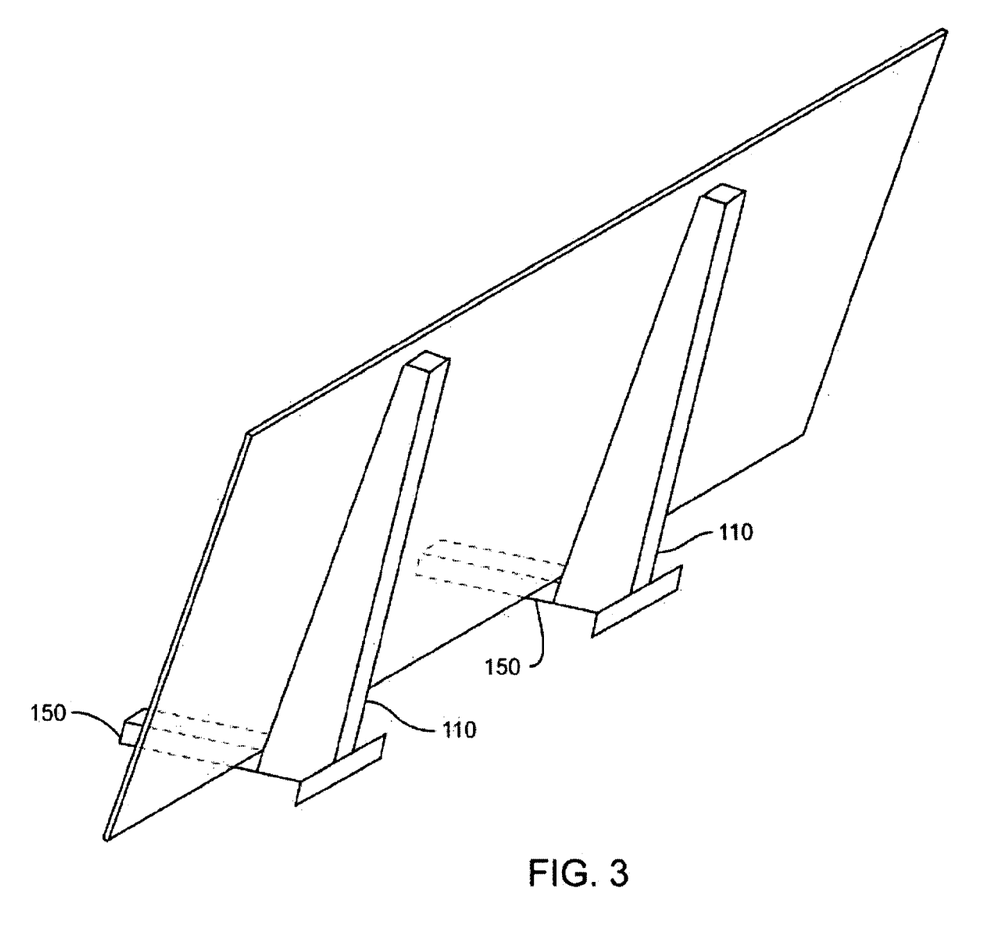
FIG. 3 illustrates the use of two individual portable material stands to support a single object.

FIG. 2 illustrates one embodiment of the invention. FIG. 2 illustrates that two portable material stands may be used in conjunction with each other. Using the invention in this manner may provide for further stability or may also provide for standing or staging larger items. FIG. 3 illustrates the invention used in such a fashion. Those of ordinary skill in the art will readily recognize that 3 or more portable material stands could also be used in conjunction with each other.

Another embodiment of the invention comprises the use of an attachment to the rear of the portable material stand. The attachment may comprise a flange attachment extending transverse to the stand and perpendicular to the orientation of the base portion. Such an embodiment is pictured in FIGS. 2 and 3. The attachment may be attached to the support portion 150 using any appropriate means, including the use of screws, dowels, snaps, welds, or integral construction.

Figure 6:
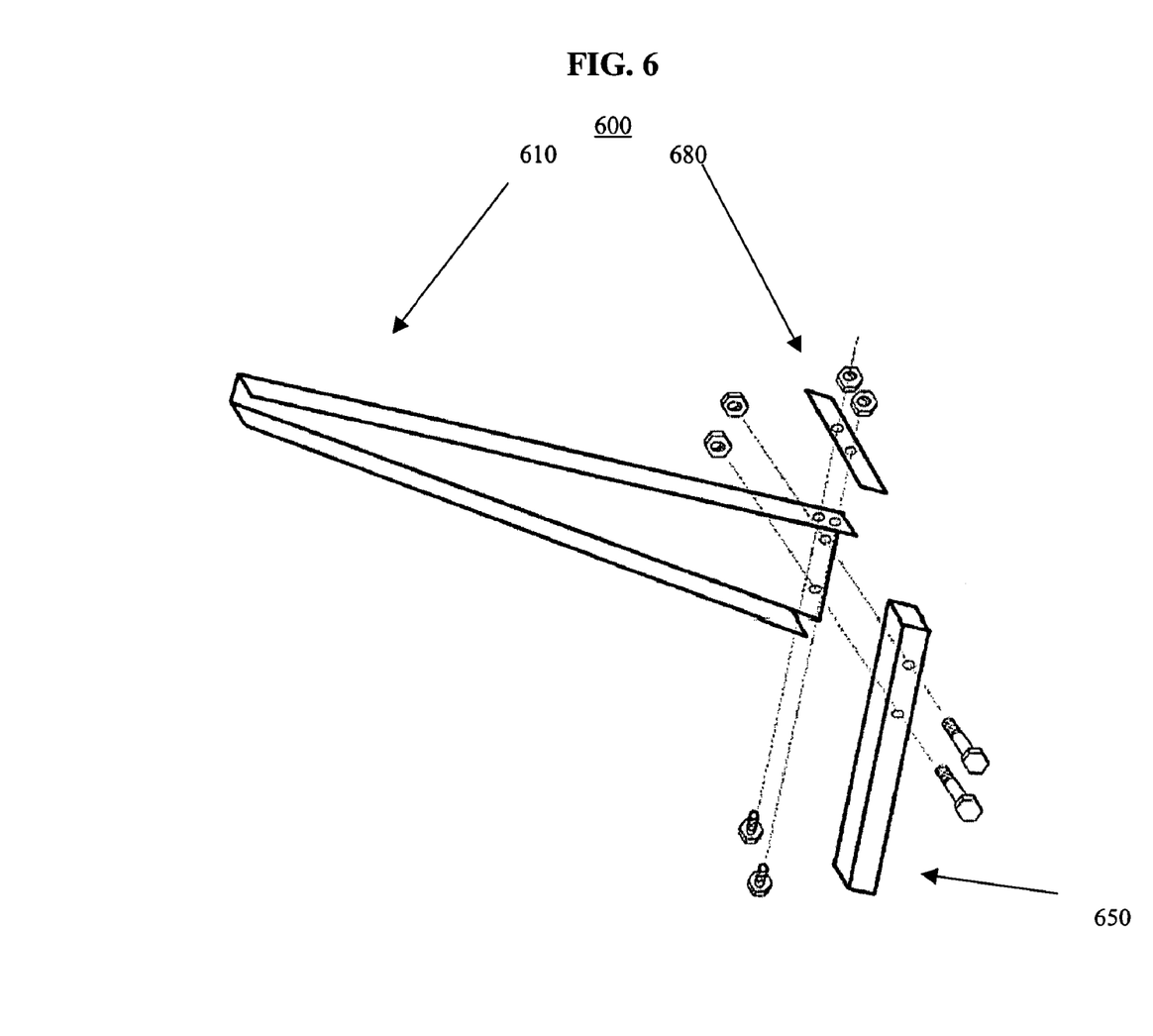
FIG. 6 illustrates an exploded view of another aspect of the invention.

FIG. 6 illustrates an exploded view of yet another aspect of the invention. As illustrated in FIG. 6, a portable material stand 600 comprises a single support portion 610 formed from a unitary piece of material, affixed to a base portion 650 and a flange portion 680. As illustrated in FIG. 6, the portable material stand is affixed with bolts and washers, although any connection means may be used in accord with the invention. In one embodiment, support portion 610 is u-shaped.

Figure 7A:
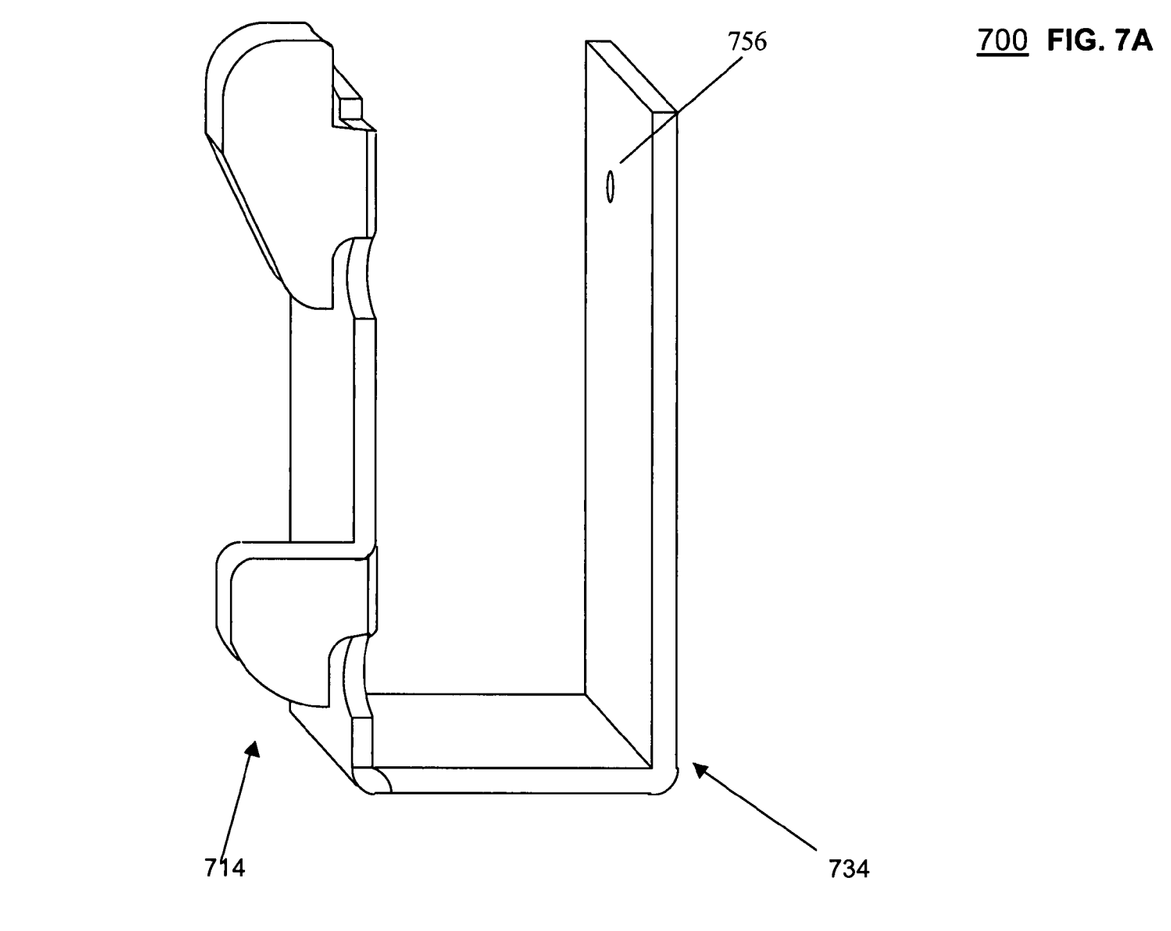
FIGS. 7A, 7B, and 7C illustrate another embodiment of the invention.
Figure 7B:
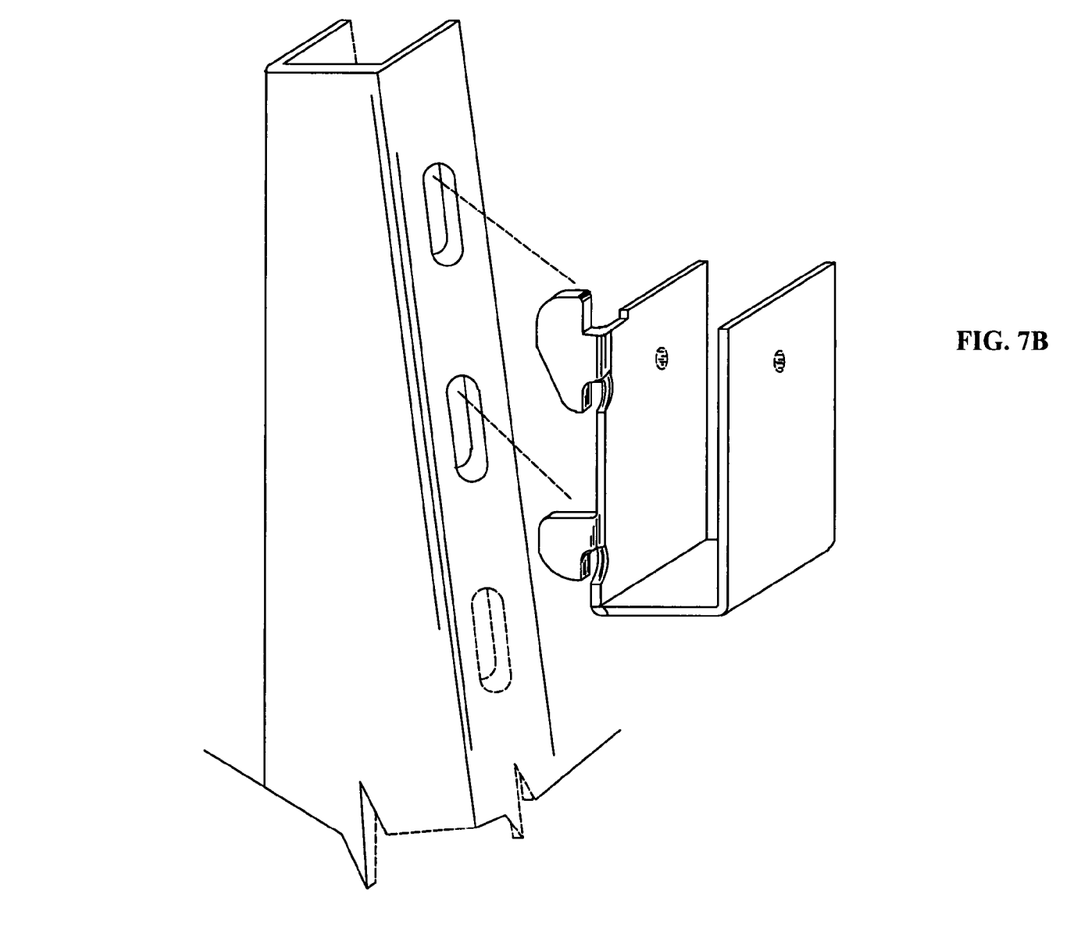
Figure 7C:
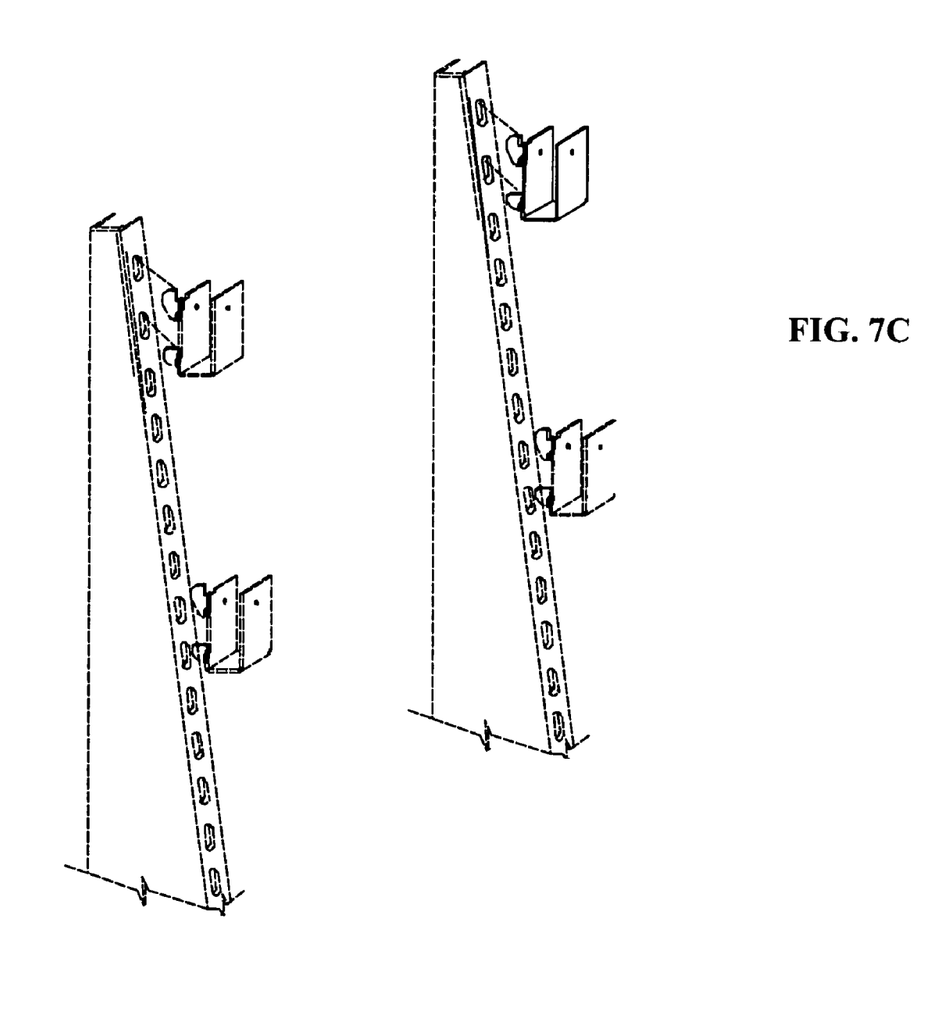

FIGS. 7A, 7B, and 7C illustrate another embodiment of the invention. FIG. 7A is a perspective view of a bracket 700 that is configured with a support portion 734 and bracket portion 714. In one embodiment, bracket portion 714 is configured as a male portion configured to mate with bracket holes 151, as illustrated in FIG. 7B and FIG. 7C. Support portion 734 is configured to support a rail, such as a hand rail or side rail. The rail may comprise any appropriate, relatively solid material. In one embodiment, the rail is a 2×4 wood rail. In one embodiment, support portion 734 comprises a positioning hole 756 configured to maintain the position of the rail relative to the support portion 734, by for example, nailing the rail to the support portion 734 through positioning hole 756.

Construction material, as used herein, includes dry wall, glass, countertops, doors, exterior and interior sheathing, piping, plywood, conduit, shelving, or any other large and/or heavy material used in the construction trades.

While the preferred embodiments of the invention have been shown and described, numerous variations and alternative embodiments will occur to those of ordinary skill in the art. Accordingly, it is intended that the invention not be limited to as described, but also encompass the equivalents of the invention described, as well as any improvements which are obvious to those of ordinary skill in the art.

What is claimed is:

1. A portable construction material stand, consisting of:
    a base portion, and a support portion extending upward from and snap-fitted with the base portion;
the support portion consisting of:
an angled contact surface such that an angle of greater than 90 degrees is created between the support portion and base portion,
a flanged portion opposite the base portion,
a top cap,
a bracket hole, and
a padding material;
wherein when planar construction material is positioned on the base portion and in contact with the contact surface, the stand maintains the material in a stationary position.

2. A portable construction material stand system, consisting of:
a first stand and a second stand spaced apart from the first stand, whereby each stand consists of:
a base portion, and
a support portion extending upward from and snap-fitted with the base portion;
the support portion of each stand consisting of:
an angled contact surface such that an angle of greater than 90 degrees is created between the support portion and the respective base portion,
a flanged portion opposite the respective base portion,
a top cap,
a bracket hole, and
a padding material;
wherein when planar construction material is positioned on the base portions of the spaced apart stands and in contact with the contact surfaces, the first and second stands maintain the material in a stationary position.

* * * * *